Oct. 25, 1949.  H. C. SCHWEITZER  2,485,782
FURNACE FOR THE HEAT TREATMENT OF SOLIDS
Filed July 3, 1945  2 Sheets-Sheet 1

INVENTOR.
HERBERT C. SCHWEITZER
BY

Oct. 25, 1949.   H. C. SCHWEITZER   2,485,782
FURNACE FOR THE HEAT TREATMENT OF SOLIDS
Filed July 3, 1945   2 Sheets-Sheet 2
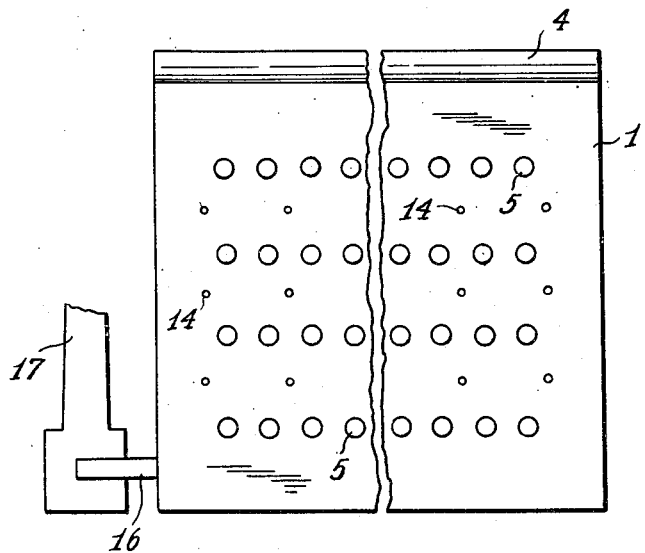
INVENTOR.
HERBERT C. SCHWEITZER
BY
ATTY.

Patented Oct. 25, 1949

2,485,782

UNITED STATES PATENT OFFICE 2,485,782

FURNACE FOR THE HEAT TREATMENT OF SOLIDS

Herbert C. Schweitzer, New York, N. Y., assignor to Associated Metals & Minerals Corporation, New York, N. Y.

Application July 3, 1945, Serial No. 602,995

2 Claims. (Cl. 263—37)

This invention relates to the heat treatment of solids; it relates particularly to the heat treatment and sintering of loose or compacted metal powders, to the reduction of metal oxides and to similar modes of heat processing solid materials.

Methods of the stated type have been hitherto frequently carried out in individual large size kilns, rotating drums, retorts, muffle furnaces and the like; also suggestions have been made to install a small number of retorts in a single closed furnace.

The main disadvantages of the hitherto customary apparatus of this type are insufficient productive capacity and a low heat economy.

On the other hand, it is customary since decades in the zinc metallurgy to locate a large number of comparatively small muffles in a large zinc furnace, the oxidic zinc bearing charge and a carbonaceous reducing agent being periodically charged into these muffles which are open at the one, and closed at the other end. In this case, a major part of the retort charge passes through the liquid and/or gaseous state. Furthermore, furnaces of this type permit a batch type or interrupted operation only and are not applicable to the substantially continuous heat treatment processes for solid materials involved in the instant invention.

It is, therefore, the primary object of this invention to provide a large size furnace for the continuous high temperature treatment of solids which combines a maximum processing capacity and heat economy.

It is a further object of the invention to assure in this large size furnace a perfect temperature and work control.

It is another object of the invention to provide a large capacity furnace which can be easily and without a change of its parts adapted to any variety of continuous high temperature treatment of solids and particularly of finely divided solid materials in loose or compacted form.

With these and other objects in view which will become apparent as this specification proceeds, the invention comprises in its broadest aspect the accommodation of a large number of continuously operatable retorts in a large size furnace, these retorts being arranged side by side in horizontal and in superposed vertical rows. The number of vertical rows of retorts is, as a rule, greatly smaller than that of the horizontal rows; there may be, for instance, up to eight retorts in a vertical row, whereas the number of retorts in the horizontal row may vary between about twenty to two hundred. Accordingly, the furnace has its main dimension in the direction of the horizontal rows, whereas the retorts extend transversally to this longitudinal direction through the entire width of the furnace.

The furnace is preferably of rectangular shape and encases one large combustion chamber, divided by at least one intermediary wall in a plurality of heating compartments which are transited by the retorts; the retorts project at the front and the rear side from the furnace. The solids to be treated are charged into the retorts at the one projecting end and discharged from the same at the other end. By the subdivision of the heating space into compartments which may be individually heat-regulated a controlled adaptation of the furnace operation to individual sections of the retorts is achieved in a simple and efficient manner.

Means may be provided to transport the materials to be treated through each retort; these conveying means may be screw or belt conveyors or pusher devices of customary construction.

The instant furnace bears a certain similarity to a modern horizontal zinc furnace or a magnesium retort furnace for the reduction of magnesium oxide with ferrosilicon; it differs, however, from these well known furnace types principally by the fact that the individual retorts pass through the entire width of the furnace and that a pluraliy of more or less separated furnace compartments are provided which permit a reliable control of the heat treatment.

The dividing or intermediary vertical walls may extend from the furnace bottom to the arch and so separate the furnace compartments. However, these walls may also end short of the furnace arch; they may also be provided with passages connecting the individual compartments. In this manner a multitude of continuously workable retorts, for instance 20-200, may be arranged side by side in each horizontal row, and a restricted number of retorts, for instance 2-8, may be superposed in the vertical rows.

In order to control the temperature in the furnace, burners are distributed at equal distances over the entire length of the same. These burners may be arranged similarly to the retorts in several parallel and vertical rows with the only difference that always one burner is provided for a plurality of retorts in each parallel and vertical row. These burners may be arranged either at the front and the rear side of the furnace or in the intermediary walls. Means are provided to regulate and control each burner from the outside.

The burners are preferably arranged in such a manner that the flames follow a path substantially parallel to the longitudinal axis of the retorts, and in any case pass along the side walls of the retorts without impacting the retort walls at a perpendicular or acute angle.

The retorts may be placed in the furnace either in horizontal or in a slightly inclined position. Each retort is supported at several places, i. e. in the front and in the rear wall and in the intermediary walls. The retorts project from the furnace at the front and the rear side.

In order to improve the heat economy hood-like extensions are provided at the front and at the rear wall of the furnace; these hoods encase the projecting ends of the retorts at the charging and discharging side. In this way, a part of the heat otherwise lost by radiation may be utilized for the preheating of the materials introduced into the retorts; on the other hand, a zone is created where the treated and discharged materials may undergo a slow cooling.

Means are provided to perform the heat treatment of each retort in any desired or protective atmosphere. For this purpose inlets and outlets for hydrogen, natural gas or combustion gases of controlled composition are provided near the charging and discharging end of the retorts.

In order to avoid, as far as possible, the entrance of atmospheric air into each retort, flaps and other valve-like devices as well as flame curtains can be arranged near the otherwise open charge and discharge end of each retort.

A preferred embodiment of the furnace constructed to comply with the purposes of this invention is illustrated by way of example in the attached drawings.

In the drawings,

Fig. 3 is a front view of the charging side of the furnace on line 3—3 of Fig. 1.

Fig. 2 and Fig. 3 are both broken views, showing the two end portions of the furnace.

Figure 1:
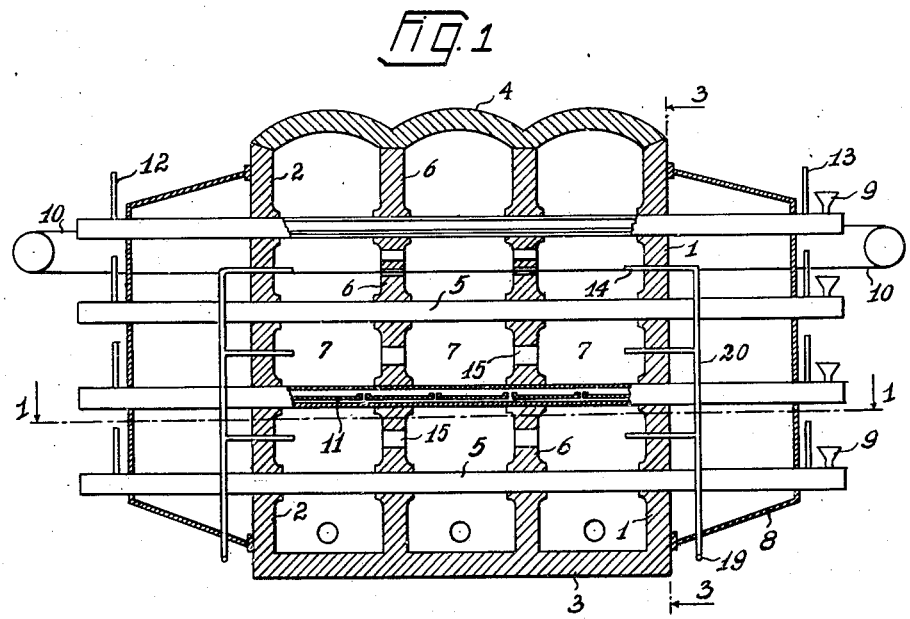
Fig. 1 is a vertical sectional elevation on line 2—2 of Fig. 2.
Figure 2:
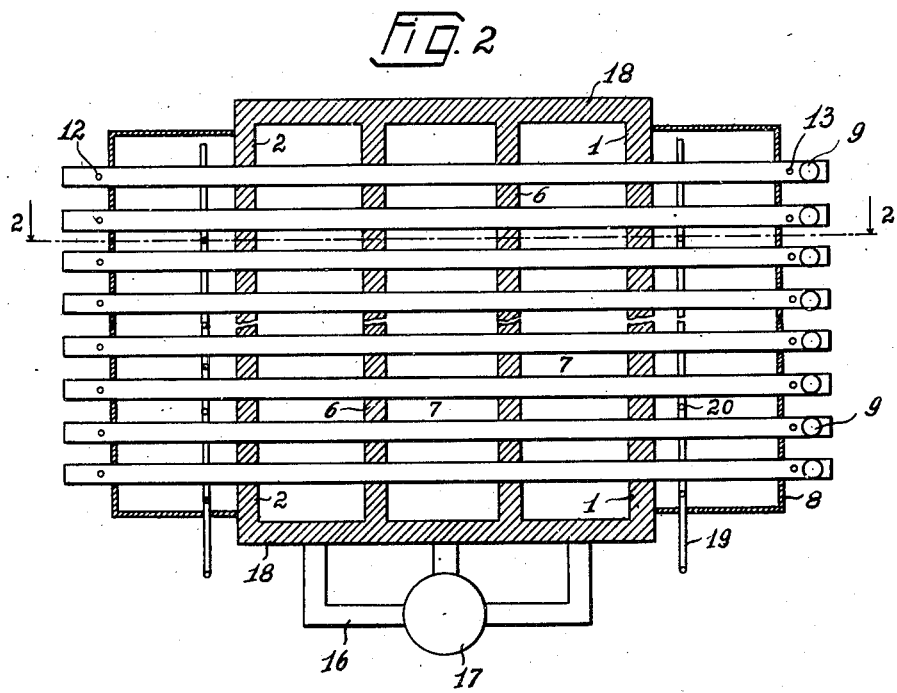
Fig. 2 is a horizontal sectional elevation on line 1—1 of Fig. 1.

As apparent from the drawing, the furnace comprises a longitudinally extending rectangular refractory structure composed of a front wall 1 and a rear wall 2 of similar configuration, a base 3, a roof 4 and side walls 18.

These walls and the roof enclose a longitudinally extending combustion and heating chamber which is divided by intermediary walls 6 into combustion compartments 7; the intermediary vertical walls 6 may reach to the roof 4, as shown, or they may end short of the roof.

A multitude of retorts is mounted in the furnace in horizontal and in superposed vertical rows; the retorts are in the present embodiment of the invention slightly inclined in the direction from the front wall 1 to the rear wall 2. Four vertically superposed rows of retorts are shown. However, this number may be varied. The number of retorts in the horizontal rows is much larger than that in the vertical rows, in conformity with the length of the furnace.

The retorts pass transversely through the width of the furnace and project at the front and the rear wall 1, 2 from the same.

The retorts are in a customary manner removably and replaceably located in the furnace. The projecting ends of the retorts are encased by hoods 8 which are preferably made demountable.

Charging funnels 9 are provided in the charging end of the retorts.

Customary devices, such as conveyor belts 10 or boats 11 are provided for the substantially continuous transport of the charge through the retorts. Pusher and similar known devices advance the boats through the retorts.

Closable inlets 12 and outlets 13 are attached to the retorts for the purpose of introducing a gas atmosphere to the retorts if so desired.

The fuel is supplied through burners 14 connected to pipe system 19, 20 and customary regulating valves will be provided to control the fuel supply to each burner.

The fuel conducting pipes are shown as applied to the front and the rear compartment, the center compartment being connected to the directly heated front and rear compartment through passages 15; however, a separate fuel supply may also be provided for the center compartment, if the latter is desired.

Separate exhaust conduits 16 leading to chimney 17 are installed for each compartment 7.

By control of the fuel supply and of the discharge of the combustion gases the desired working temperatures may be maintained in the individual compartments and therewith in those portions or sections of the retorts which pass through the same.

The above described furnace is particularly usable for the following processes:

1. Reduction of oxides, such as iron oxide, copper oxide, nickel oxide, cobalt oxide, lead oxide, tungsten oxide, molybdenum oxide, tin oxide and the like, which may be reduced in the solid state by the action of a gas or solid reducing agent substantially without forming a liquid phase.

2. For the sintering of metal powder compacts preferably in desired generally reducing atmospheres at temperatures ranging between 600–2500° F.; also in this case no, or practically no visible liquid phase is formed during the heat treatment of the charged material.

3. For other heat treatments, such as carburizing, decarburizing, annealing operations, that is to say for all processes where the properties of the material are improved by action of elevated temperatures with or without coaction or interference of the atmosphere maintained in the retorts.

The particular advantage of my new furnace consists, as mentioned previously, in the creation of a unit which allows to treat large quantities of materials in one furnace with a minimum consumption of fuel and heating costs. On the other hand, it allows a simple but well controlled adaptation of desired heating conditions to portions of the retorts.

I claim:

1. A furnace for the continuous heat-treatment of metal bearing material and for the recovery of the treated materials in the solid state comprising a closed combustion chamber of a substantially rectangular cross-section composed of two long front and rear walls, two short side walls, a base and a roof portion, a multitude of substantially horizontal retorts located in vertically superposed and parallel side-by-side relationship in said chamber, said retorts extending with their longitudinal axes at a right angle to the longitudinal extension of said chamber, at least two heating compartments and an intermediary wall therebetween in said chamber, said heating compartments and said separating wall extending in parallel relationship throughout the entire length of said chamber, said retorts projecting at both ends from said chamber, means to charge the materials to be treated at the one retort end, means to continuously propel the charge through said retorts and to discharge the treated materials from the opposite retort end.

2. In a furnace according to claim 1, hoods enclosing said projecting retort portions and ending short of said charging and discharging means.

HERBERT C. SCHWEITZER.

REFERENCES CITED

The following references are of record in the file of this patent:

UNITED STATES PATENTS

| Number | Name | Date |
|---|---|---|
| 708,567 | Loose | Sept. 9, 1902 |
| 839,160 | Lanyon | Dec. 25, 1906 |
| 890,251 | Thompson | June 9, 1908 |
| 1,627,538 | Beam | May 3, 1927 |
| 2,071,082 | Moore | Feb. 16, 1937 |

FOREIGN PATENTS

| Number | Country | Date |
|---|---|---|
| 408,093 | France | Mar. 17, 1910 |